Aug. 16, 1932.  J. VAN ACKEREN  1,872,612
COKING RETORT OVEN
Filed Jan. 26, 1928     6 Sheets-Sheet 5
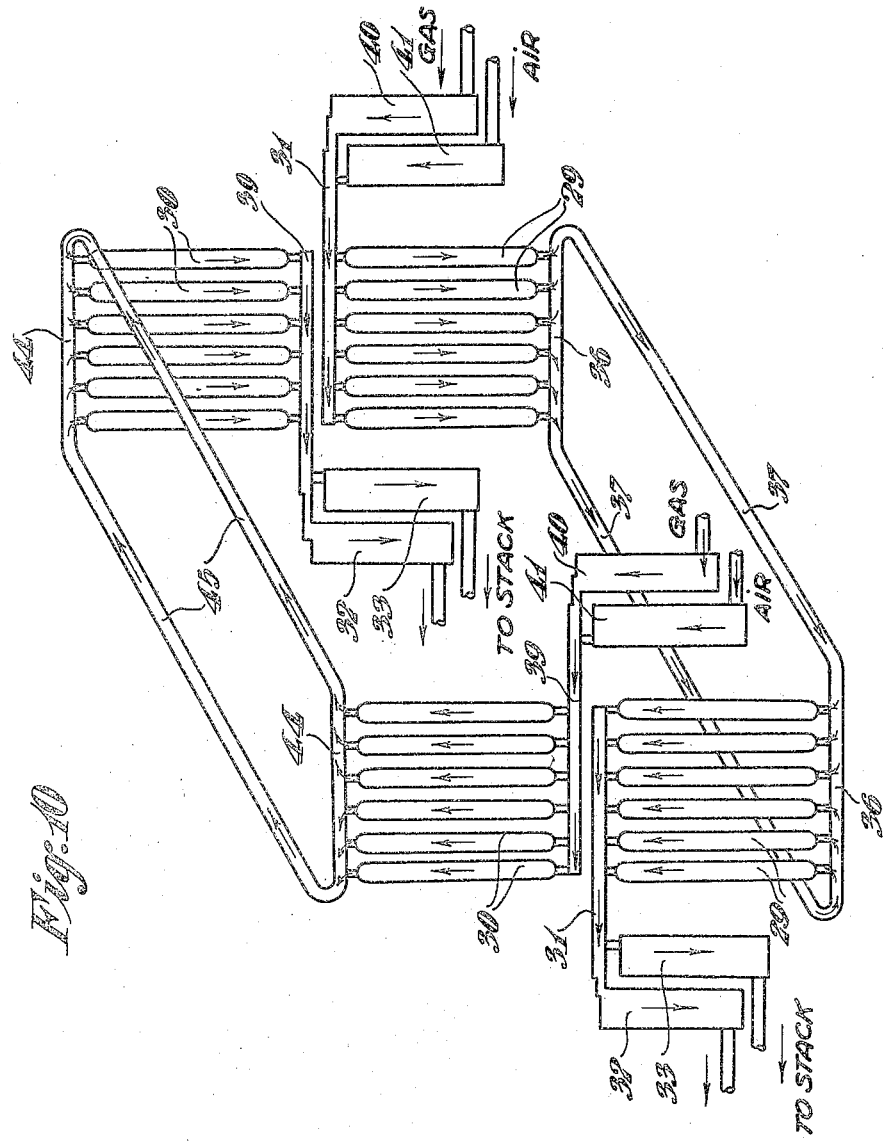
INVENTOR.
Joseph van Ackeren.
BY Jesse P. Langley
ATTORNEY

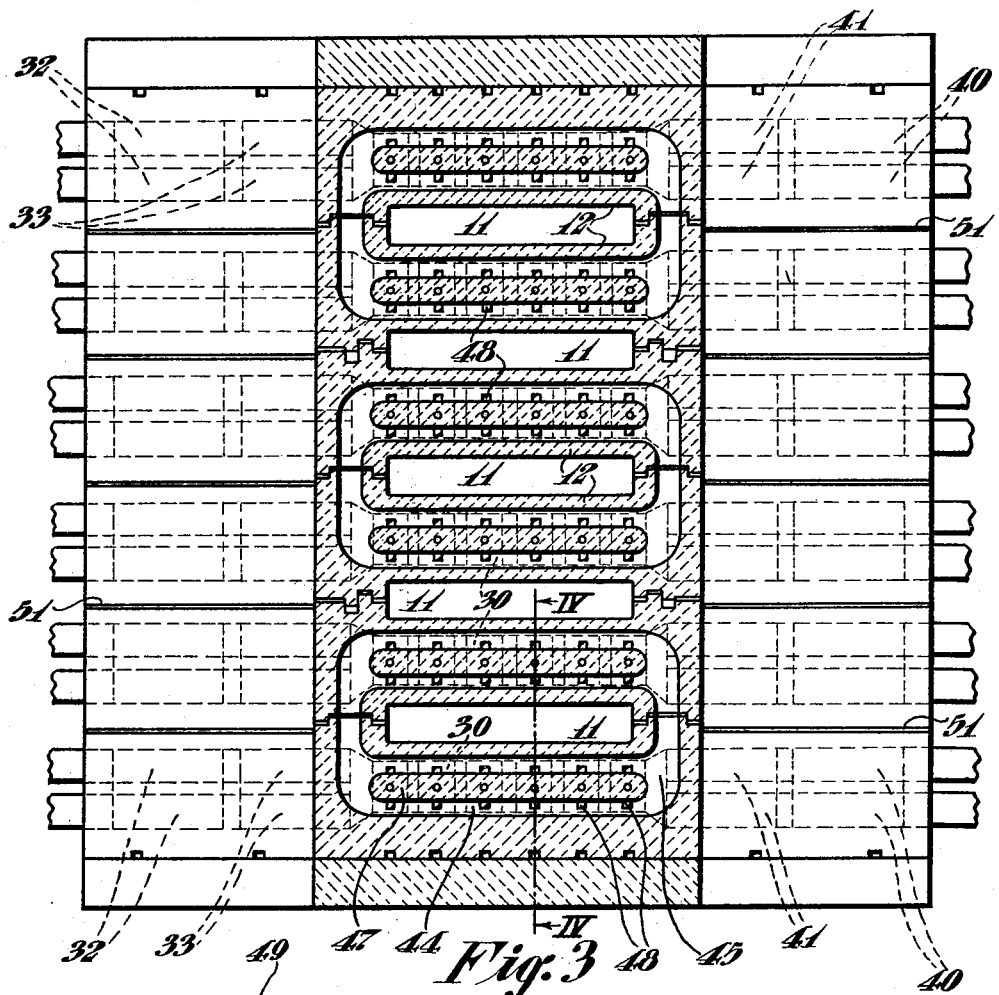
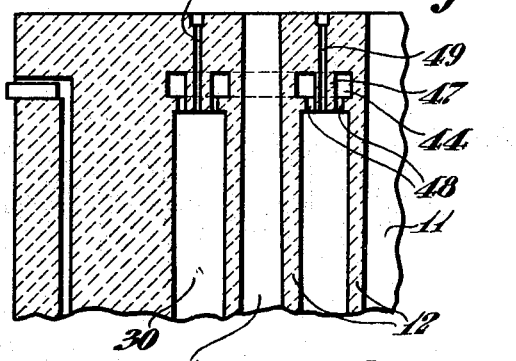
Fig. 3
Fig. 4

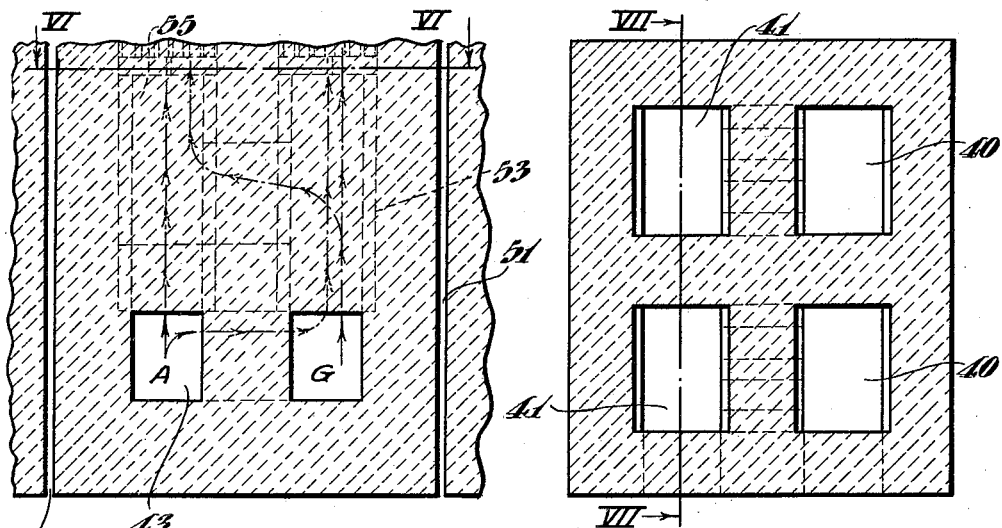
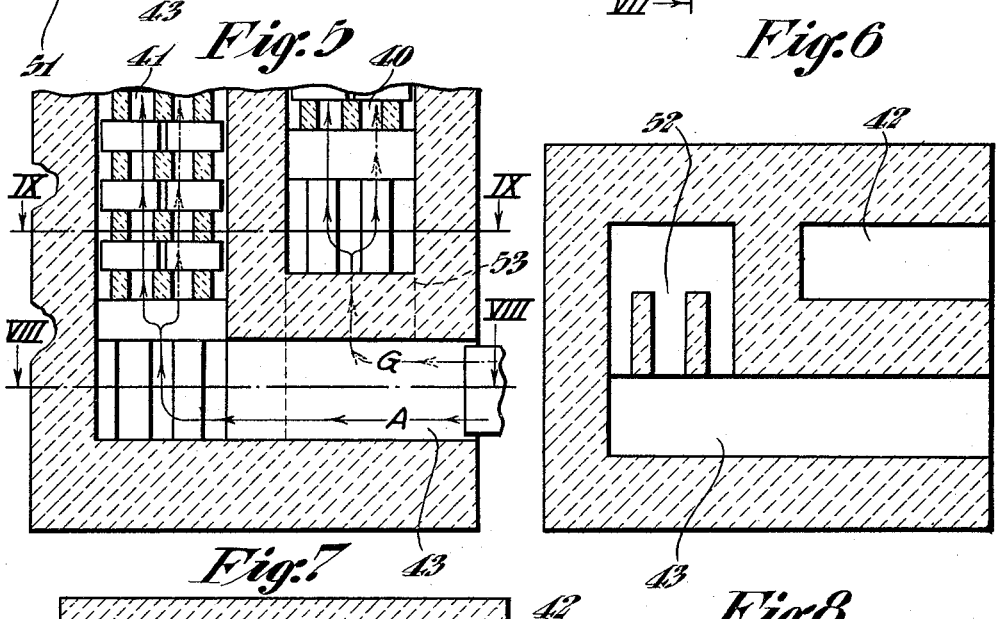
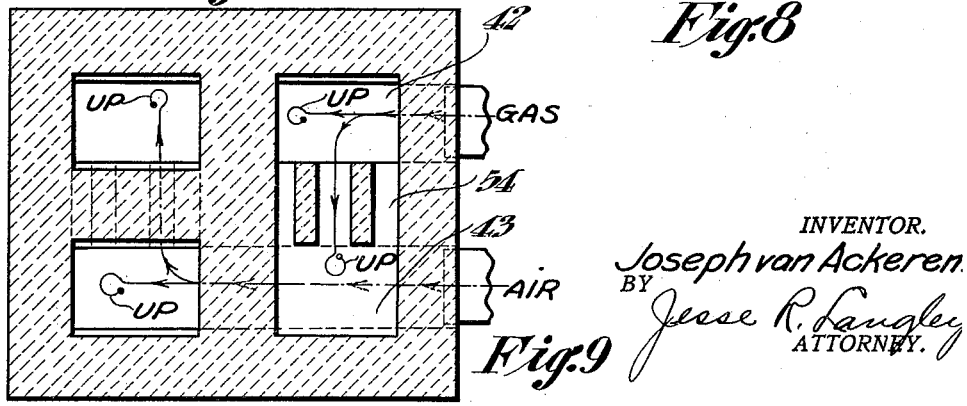

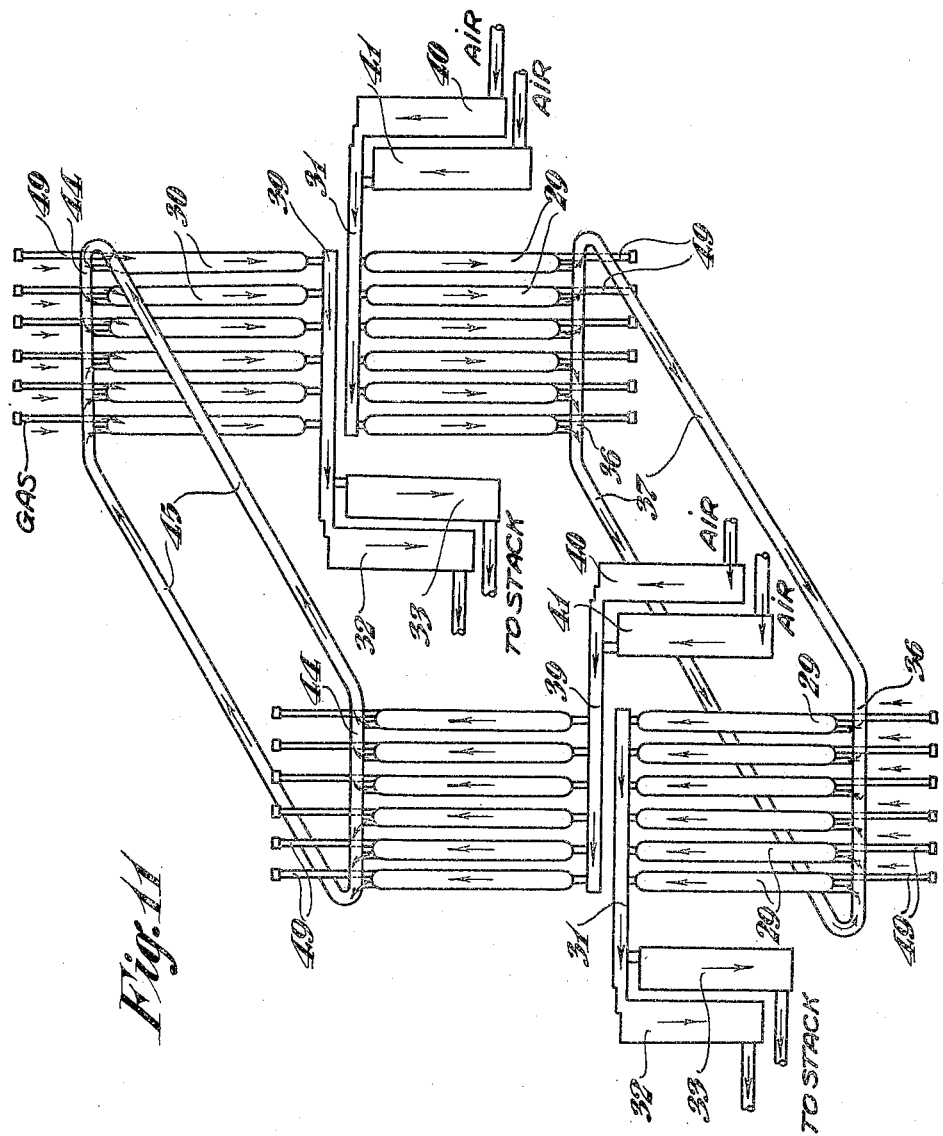

Patented Aug. 16, 1932

1,872,612

UNITED STATES PATENT OFFICE

JOSEPH VAN ACKEREN, OF O'HARA TOWNSHIP, ALLEGHENY COUNTY, PENNSYLVANIA, ASSIGNOR TO THE KOPPERS COMPANY OF DELAWARE, A CORPORATION OF DELAWARE

COKING RETORT OVEN

Application filed January 26, 1928. Serial No. 249,520.

My invention relates to coking retort ovens and particularly to combination coke ovens of the continuous vertical type.

An object of my invention is to provide a battery of vertical coke ovens having separate series of regenerators that may be respectively employed to transmit waste gases and gas or air.

A further object of my invention is to provide a battery of vertical coke ovens having two separate series of regenerators of which the one or the other of the series transmits air or gas and the remaining one transmits waste gases whereby there can be no counterflow between adjacent passageways carrying fuel gas and waste gases.

A still further object of my invention is to provide a vertical coke-oven battery having two series of regenerators which may be relatively low in height and in horizontal extension of a portion of the oven structure and that may always be operated in a normal manner with respect to the direction of gases therethrough.

In accordance with my invention, I provide a vertical coke-oven battery with heating walls, each of which has an upper and a lower group of flame flues that are structurally and functionally independent of each other. Each of the upper groups of flame flues is provided with an upper horizontal flue and the horizontal flues of two adjacent walls are connected by cross-around flues. Each of the upper groups of flame flues is also provided with a lower horizontal flue that is connected to regenerators that are located on the respective sides of the battery structure in horizontal extension of approximately half the height of the oven chambers.

In a similar manner, the flame flues of the lower groups in each heating wall are connected to a lower horizontal flue and these horizontal flues of adjacent walls are connected by cross-around flues. Each of the lower group of flame flues is provided with an upper horizontal flue that is connected to a pair of regenerators located on the one or the other side of the battery structure.

From the foregoing arrangement of connections, it will be noted that the heating walls are connected in pairs and that the upper groups of flame flues are connected in series whereby heating gases pass upward in one of the walls and downward in the other wall. Similarly, the lower groups of flame flues are connected in series and heating gases flow downward in one of the walls and upward in the co-operating wall.

The regenerators, which, as stated above, are on each side of the battery structure, are so connected to the several series of groups of flame flues that all of the regenerators on one side of the battery supply air and gas simultaneously to the groups of flame flues while all of the regenerators on the other side of the battery simultaneously transmit waste gases from the heating walls to a waste gas main. Upon reversal of the battery connections, all of the regenerators which previously transmitted waste gases now transmit air and gas to the series of groups of flame flues for burning in the opposite directions. All of the regenerators on the other side of the battery which previously transmitted gas and air now transmit waste gases to the corresponding waste gas main.

By reason of the location and arrangement of the regenerators in separate series on opposite sides of the battery, there can be no counterflow between adjacent passageways carrying fuel gas and waste gases. Furthermore, all of the regenerators operate in a normal manner at all times with respect to the direction of gases therethrough in that gas and air are always admitted at the bottoms of the regenerators and are discharged from the tops thereof while waste gases are always admitted at the tops of the regenerators and are discharged from the bottoms of the same.

My invention will now be described in connection with the accompanying drawings, in which Figure 1 is a view, in vertical section, of a battery of continuous vertical coke ovens of the combination type constructed in accordance with my invention;

Fig. 3 is a view in horizontal section taken on line III—III of Fig. 2;

Fig. 4 is a fragmentary sectional view taken on line IV—IV of Fig. 3;

Fig. 5 is a fragmentary sectional view taken on line V—V of Fig. 2;

Fig. 6 is a sectional view, taken on line VI—VI of Fig. 5;

Fig. 7 is a similar view, taken on line VII—VII of Fig. 6;

Fig. 8 is a sectional view, taken on line VIII—VIII of Fig. 7;

Fig. 9 is a sectional view, taken on line IX—IX of Fig. 7;

Fig. 10 is a diagrammatic view, illustrating the flow of gases through two co-operating heating walls when lean gas is employed; and Fig. 11 is a view, similar to Fig. 10, illustrating the flow of gases when rich gas is employed as a fuel.

Figure 1:
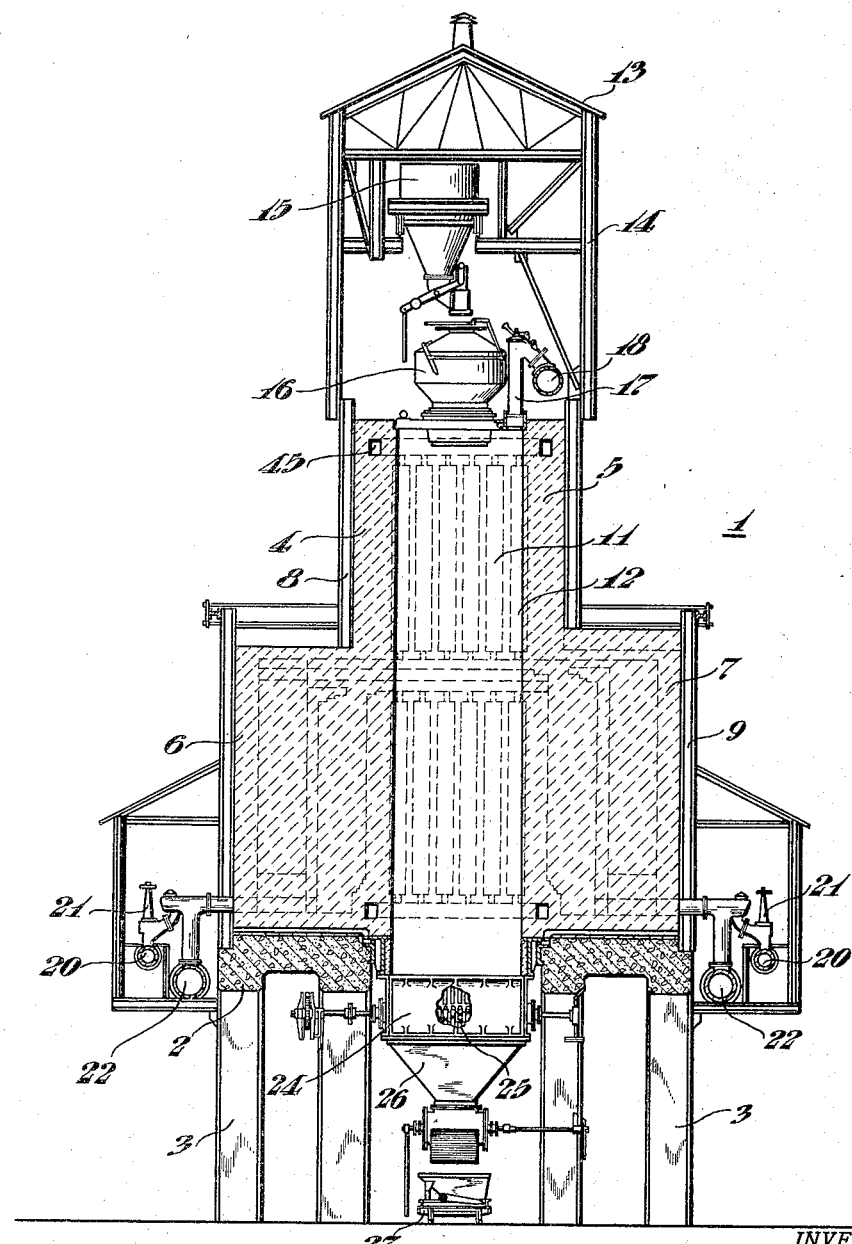

Referring particularly to Fig. 1, a battery 1 of combination vertical coking retort ovens of the continuous type comprises a foundation 2 that is supported by a series of columns 3 and upon which foundation is mounted an oven structure comprising side walls 4 and 5 that extend the height of the ovens. Lower outer walls 6 and 7 are spaced from the walls 4 and 5, respectively, to provide a series of regenerators on opposite sides of the battery. A framework comprising buckstays 8 and 9 is associated with the several outside walls of the battery.

Between the walls 4 and 5 are a series of vertical coking retorts or oven chambers 11, through one of which the sectional view is taken, one of the heating walls 12 which alternate with the retorts 11 appearing in this view with its vertical flame flues shown in dotted lines.

A superstructure 13 that is supported by framework 14 provides a support for a movable charging car 15 for supplying coal magazines 16 for the several retort ovens 11. Each of the ovens 11 is provided with a gas offtake 17 that is connected to a gas-collecting main 18. Producer gas or other lean gas is supplied to the heating walls 12 of the battery through gas mains 20 that are provided with suitable regulating valves 21. Waste gas mains 22 conduct waste gases from the regenerators to the stack.

The structure surrounding each of the retort ovens 11 is supported by a hollow metallic frame 23 that is suitably connected to the foundation. Suspended from the frame 23 is a hollow casing 24 within which is located a power-driven coke-extractor mechanism 25. A coke magazine 26 is suspended from the casing 24 and is arranged to discharge its contents into a coke-receiving car 27 that operates beneath the battery.

Figure 2:
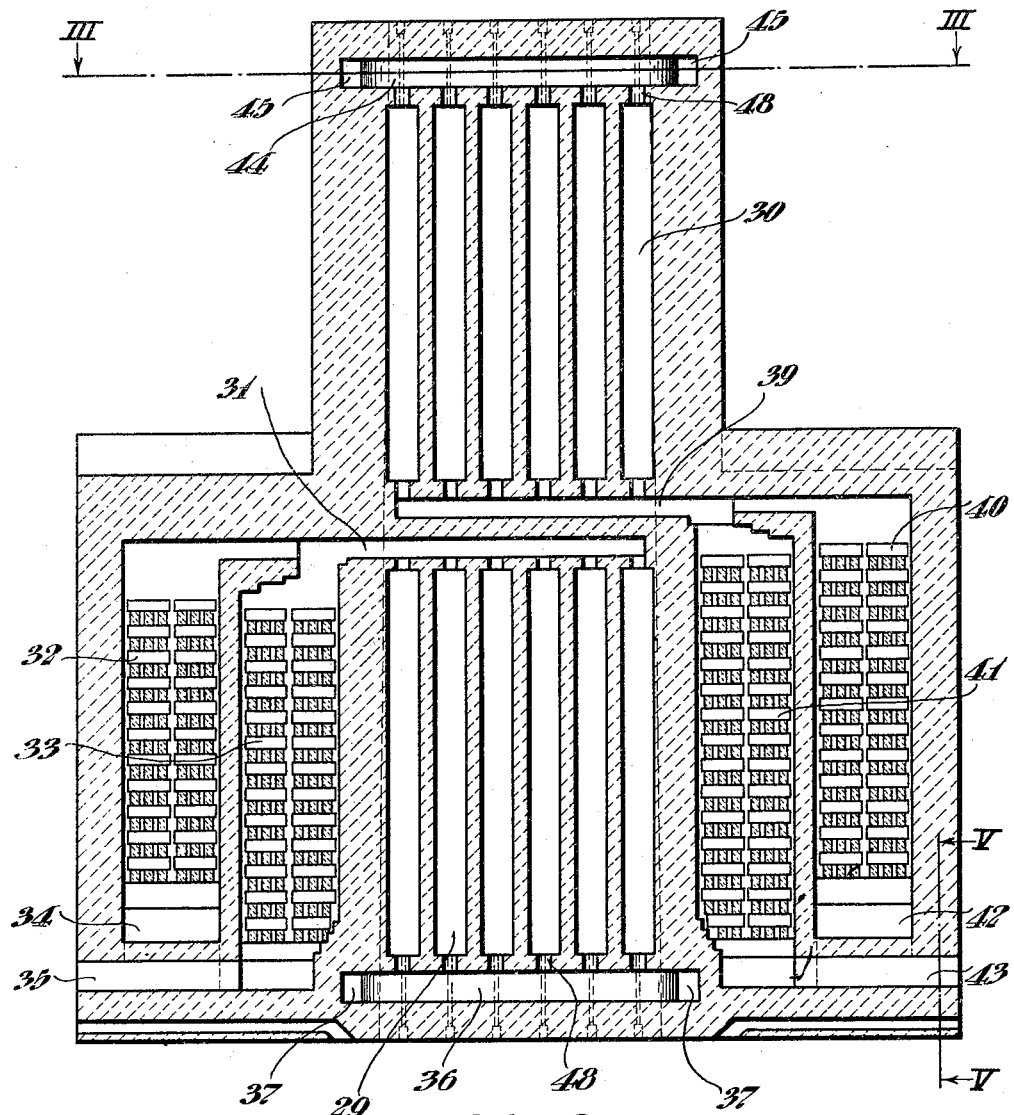
Fig. 2 is an enlarged view, in vertical section, through one of the heating walls of the battery and the associated regenerators.

Reference may now be had to Figs. 2, 3 and 4, in which the details of the heating walls and the connections of the flame flues therein are illustrated. Each heating wall 12 is provided with two superposed series of vertical flame flues 29 and 30, respectively. The lower series of flame flues 29 of the heating wall 12 shown in Fig. 2 are connected to an upper horizontal flue 31 that is connected in turn to two pairs of regenerators 32 and 33 respectively provided with sole channels 34 and 35. The flame flues 29 are also connected at their bottom portions to a lower horizontal flue 36. Each end of the flue 36 extends into a cross-around flue 37 by means of which the flue 36 is connected to a corresponding horizontal flue 36 in an adjacent heating wall 12.

The upper series of flame flues 30 of the heating wall 12 shown in Fig. 2 is similarly connected to a lower horizontal flue 39 that is in turn connected to two pairs of regenerators 40 and 41 that are respectively provided with sole flues 42 and 43. The tops of the flame flues 30 are connected to a horizontal flue 44 which extends at each end thereof into cross-around flues 45 that are connected to a corresponding horizontal flue 44 in the adjacent heating wall 12, to which wall the lower cross-around flues 37 are also connected.

The foregoing system of connections applies to the heating wall shown in Fig. 2 and to alternate heating walls 12 of the battery, that is, to the corresponding members of each pair of heating walls. As is clearly indicated in Fig. 10, the other members of the pairs of heating walls are provided with a somewhat different arrangement in that the connections between the horizontal flues 31 and 39 and the pairs of regenerators 32 and 33 and 40 and 41 are transposed with respect to those of Fig. 2.

Accordingly, the regenerators 32 and 33 of alternate units are connected to the corresponding horizontal flues 31 while the other units are connected to corresponding horizontal flues 39. The regenerators 40 and 41 of alternate units are connected to corresponding horizontal flues 39 and the other units are connected to the corresponding horizontal flues 31.

Referring particularly to Fig. 3, it will be noted that the battery 1 comprises, by way of example, five retort ovens 11 and six heating walls 12, although this number may be extended, if desired. The heating walls 12 are connected in pairs by means of the cross-around flues 37 and 45, the arrangement being similar at the tops and the bottoms of the heating walls. It will be noted that the horizontal flues 44, which are similar to the horizontal flues 36, are divided to provide a wall 47 of brickwork therebetween and each division of the horizontal flues 36 and 48 is connected to the flame flues by ports 48.

As best shown in Fig. 4, the flame flues of the respective heating walls may be supplied with coke-oven gas or other rich gas through gas guns 49 which extend from the top of the battery through the brickwork 47 between the divisions of the horizontal flue 44. An arrangement similar to that shown in Fig. 4 is provided at the bottom of each heating wall whereby rich gas may be supplied to the lower series of flame flues in a manner to be hereinafter described.

Referring again to Fig. 3, it will be noted that the battery structure is provided with a series of expansion joints 51 that extend transversely of the battery through the walls 6 and 7, between the adjacent regenerator units, and through the side walls 4 and 5 into the oven chambers of the several coke ovens. By means of this arrangement, no combustible materials or waste gases are obliged to pass through the expansion joints and leakage thereof from this cause is entirely avoided. This arrangement is of advantage, also, in that the expansion of each unit comprising a system of regenerators and the corresponding heating wall may be confined to that unit and such expansion is not transmitted to any portion of the adjacent unit.

As indicated by dotted lines in Fig. 3, the regenerators on each side of the battery structure are arranged in pairs that operate in parallel. The regenerators 40 and 41 and their system of connections will be described by way of example. The regenerators 32 and 33 are similarly arranged. Each regenerator unit comprises two pairs of regenerators, the members of each pair being in side-by-side relation and the two pairs extending in alinement with the heating wall to which they are operatively connected.

The system of connections for one regenerator unit is shown in detail in the enlarged views of Figs. 5 to 9, inclusive. It may be assumed that the regenerator unit is receiving gas and air to be supplied to the corresponding heating wall. The sole flue 43, which, for example, is carrying air, extends to the bottom of one of the regenerators 41. A lateral duct 52 connects the sole flue 43 with the base of the companion regenerator 41 whereby the sole flue 43 supplies air to the pair of regenerators 41 in parallel.

The sole flue 42, which supplies gas to the pair of regenerators 40 in parallel, is short relatively to the sole flue 43. As indicated in dotted lines in Figs. 5 and 7, the horizontal sole flue 42 is connected at its inner end to a vertical duct 53 that extends to the base of one of the regenerators 40. A lateral duct 54 that is connected to the vertical duct 53 extends horizontally to the left above the sole flue 43 and is connected by a short vertical duct 55 to the base of the other regenerator 40.

The operation of the battery of vertical ovens will now be described with particular reference to the heating systems of a pair of adjacent heating walls when the latter are supplied with lean gas as a fuel, the direction of gases being diagrammatically shown in Fig. 10. It may be assumed that the several oven chambers 11 are being supplied with coal from their respective magazines 16 and that the coal in the various oven chambers is in various stages of coking corresponding to the distance it has travelled from the tops of the ovens, finished coke being removed by the coke extractors 25. It may be assumed further that the heating walls are being supplied with lean gas and that the direction of the flow of gases through the several passageways of the heating walls is as illustrated in Fig. 10. The several regenerators 32, 33, 40 and 41 are diagrammatically shown as single regenerators instead of pairs in parallel, since they constitute in effect a single regenerator.

Fuel gas is supplied from the main 20 through the valves 21 to the regenerators 40 from which the gas enters the horizontal flue 31 of the second wall shown in Fig. 10. Air is supplied through the regenerators 41 of the same unit and it enters the horizontal flue 31 beneath the current of gas. The resultant burning gas is distributed along the horizontal flue 31 to the several vertical flame flues 29 and thence downwardly into horizontal flue 36. The hot gases then flow in opposite directions toward the ends of the horizontal flue 36 and into the cross-around flues 37 by which they are carried to the horizontal flue 36 of the first heating wall shown in Fig. 10 to be distributed for upward flow in the vertical flame flues 29. The products of combustion are received by the horizontal flue 31 and are discharged through the regenerators 32 and 33 in parallel to be carried to the stack.

In a similar manner, gas and air are supplied through the regenerators 40 and 41 of the regenerator unit corresponding to the first heating wall and the burning gases flow successively through the horizontal flue 39, upwardly through the vertical flame flues 30, cross-around flues 45, horizontal flue 44, downwardly through the vertical flame flues 30 of the second wall, horizontal flue 39 and regenerators 32 and 33 to the stack.

From the foregoing, it will be noted that gas and air are supplied to both systems of heating flues by regenerators on the same side of the battery and that the waste gases or products of combustion are exhausted through adjacent regenerators on the opposite side of the battery. The direction of gases is the same in each heating wall for the two sets of superposed vertical flame flues.

The directions of the gases in the various portions of the systems are indicated by arrows.

In accordance with usual practice, the direction of flow of gases through the heating systems is reversed periodically by suitable reversing means (not shown). Upon reversal, air and gas are supplied by the regenerators 33 and 32, respectively, of adjacent units, while waste gases pass downwardly through the regenerators 40 and 41. The directions of flow of gases through the various portions of the systems are opposite to those indicated by the various arrows.

The operation of the heating systems of the pair of walls referred to above is typical of that of the three pairs of heating walls shown in Fig. 3. The various connections for the several pairs of heating walls are controlled simultaneously in order that uniform conditions may obtain throughout the battery. Accordingly, at any stage of the operation, air and gas are being supplied simultaneously to the several heating systems by the regenerators on one side of the battery. Waste gases are passing outwardly through all of the regenerators on the opposite side of the battery. Upon reversal, the same conditions obtain except that the functions of the regenerators are reversed.

When rich gas, such, for example, as coke-oven gas, is employed as a fuel, the system of operation is somewhat different by reason of the characteristics of the fuel. A diagrammatic illustration of the system of connections when rich gas is used as fuel appears in Fig. 11, to which reference may now be had. Inasmuch as it is unnecessary to preheat rich gas, the regenerators 40 and 41 are employed to preheat air which passes through the horizontal flues 31 and 39 that are connected thereto and the adjacent vertical flame flues and cross-around flues 37 and 45 to the horizontal flue 36 of the first wall and the horizontal flue 44 of the second wall. The gas guns 49 at the bottom of the first wall and at the top of the second wall are open to admit rich gas to the corresponding portions of the flame flues 29 and 30. The flames of combustion resulting from the mixture of gas and air flow upwardly in the flues 29 of the first wall and downwardly in the upper flame flues 30 of the second wall and out through the corresponding regenerators 32 and 33.

Upon reversal, air is supplied through all of the regenerators 32 and 33 and the gas guns that were previously operative are closed and those at the bottom of the second wall and the top of the first wall are opened whereby combustion occurs in the flame flues that previously were traversed by highly preheated air. In the operation just described, the gases traverse the several flues and passageways in directions opposite to those indicated by the arrows.

While the latter arrangement does not provide for products of combustion to traverse all of the flame flues in either direction of operation, the preheated air that is passing through one set of flame flues in each of the heating walls is more highly heated by reason of the fact that the products of combustion of the previous operation are discharged through the regenerators at a much higher temperature. The result is, therefore, that the preheated air upon reversal is of such high temperature that it exerts little if any cooling effect upon the flame flues traversed by the air before combustion occurs.

From the foregoing, it will be apparent that adjacent regenerators always carry either waste gases or gas and air and accordingly there is no tendency for leakage between them as the pressures in adjacent regenerators are substantially equal. The provision of expansion joints between each of the regenerator units and the heating walls provides that all of the gases may be transmitted through the system without crossing the expansion joints, except through the cross-around flues.

The arrangement whereby combustion occurs at the entrance end of the horizontal flues insures that there will be a very small dead space, if any, between the superposed series of vertical flame flues, the adjacent horizontal flue carrying hot products of combustion. Accordingly, while the upper and the lower flame flues of each wall constitute portions of separate and independent heating systems, the heating of the wall is substantially continuous throughout its height.

The arrangement of the regenerators differs from those of the known prior art relating to similar constructions in that the regenerators are always operated in a normal manner with the hot gases entering the tops of the regenerators and air and gas to be preheated always enter the bottoms of the regenerators.

The foregoing and other advantages will be apparent to those skilled in the art to which my invention relates. My invention may be variously modified and it is desired, therefore, that its scope be limited only as expressed in the following claims.

I claim as my invention:

1. A coke-oven battery comprising a series of oven chambers and heating walls therefor alternating therewith, each of said heating walls being provided with two superposed groups of vertical flame flues that are respectively communicably connected in series with the correspondingly disposed group in another of said walls, and two series of regenerators respectively communicating with one of said group of flame flues, one of said series of regenerators being adapted to receive combustible material for burning in the respective series of groups of flame flues and the other regenerators being adapted to discharge the gases of combustion.

2. A coke-oven battery comprising a series of oven chambers and heating walls therefor alternating therewith, each of said heating walls being provided with two groups of vertical flame flues that are respectively communicably connected in series with the correspondingly disposed group in another of said walls, two series of regenerators respectively disposed on opposite sides of said battery and communicating with one of said groups of flues, and means for supplying combustible materials to all of the regenerators on one side of the battery simultaneously for burning in the several series of groups of flame flues and for discharging the gases of combustion through the regenerators on the other side of said battery.

3. In a coking retort oven battery, two co-operating heating walls, each of which is provided with two superposed series of vertical flame flues and horizontal flues communicating with the flame flues of each series at their top and their bottom portions, cross-around flues for connecting one horizontal flue of each series to a correspondingly disposed horizontal flue in the other wall and regenerators communicating with each of the other horizontal flues in each of said walls.

4. In a coking retort oven battery, two co-operating heating walls, each of which is provided with two superposed series of vertical flame flues and horizontal flues connected to the flame flues of each series at their top and their bottom portions cross-around flues for connecting the upper horizontal flues of the upper series in each wall and for connecting the lower horizontal flues in the lower series in each wall and regenerators communicating with each of the other horizontal flues of each wall.

5. In a coking retort oven battery, two heating walls each of which is provided with two superposed series of vertical flame flues, a flue for connecting end portions of the flame flues of each series, a passageway communicating with a connecting flue of each series and a connecting flue of the other heating wall and regenerators communicating with each of the other connecting flues of the several series.

6. In a coking retort oven battery, two heating walls, each of which is provided with two superposed groups of vertical flame flues, means for communicably connecting an end portion of each of the flame flues of each group to end portions of a group in the other wall and regenerators communicating with the other end portions of the flame flues of each group.

7. In a coking retort oven battery, two heating walls, each of which is provided with two superposed groups of vertical flame flues, means for communicatably connecting one group of each wall in series with a group in the other wall, means for transmitting combustible materials to each series of groups and for transmitting waste gases therefrom.

8. In a coking retort oven battery, two heating walls, each of which is provided with two superposed groups of vertical flame flues, means for communicably connecting one group of each wall in series with a group in the other wall, means comprising a plurality of regenerators for transmitting combustible materials to each series of groups and for transmitting waste gases therefrom.

9. In a coking retort oven battery, two heating walls, the upper and the lower portions of each wall being provided with separate groups of vertical flame flues, means for connecting the upper groups of the said walls for operation in series and for connecting the lower groups for similar operation, and means for supplying combustible materials to the respective series of groups through an upper group in one of said walls and through the lower group in the other of said walls.

10. In a coking retort oven battery, two heating walls the upper and the lower portions of each wall being provided with separate groups of vertical flame flues, means for connecting the top portions of the flame flues of the upper groups of said walls for the operations of said groups in series and for connecting the bottom portions of the flame flues of the lower groups for similar operation, and means for supplying combustible materials to the respective series of groups of flame flues at the bottom of an upper group in one of said walls and at the top of a lower group in the other of said walls.

11. In a coking retort oven battery, two heating walls, the upper and the lower portions of each wall being provided with separate groups of vertical flame flues, means comprising cross-around flues for connecting the top portions of the flame flues of the upper groups of said walls for the operations of said groups in series and for connecting the bottom portions of the flame flues of the lower groups for similar operation, a plurality of regenerators communicably connected to both ends of each series of groups, and means for supplying combustible materials to the respective series of groups of flame flues at the bottom of an upper group in one of said walls and at the top of a lower group in the other of said walls.

12. In a coke-oven battery, a chamber having a heating wall therefor on each of two opposite sides thereof, each of said heating walls having a group of vertical flame flues in its upper portion and a similar group in its lower portion, means for communicably connecting the upper groups of both walls at the tops thereof and for communicably connecting the lower groups at the bottoms thereof, and means for supplying combustible materials to the upper groups at an intermediate portion of one wall, and for similarly supplying the lower groups at an intermediate portion of the other wall.

13. In a coke oven battery, a chamber having a heating wall therefor on each of two opposite sides thereof, each of said heating walls having a group of vertical flame flues in its upper portion and a similar group in its lower portion, means for communicably connecting the upper groups of both walls at the tops thereof and for similarly connecting the lower groups at the bottoms thereof, and means for supplying combustible materials to the upper groups at an intermediate portion of one wall and for similarly supplying the lower groups at an intermediate portion of the other wall and for discharging waste gases at the intermediate portions of both of said walls.

14. In a coking retort oven battery, an oven chamber having two adjacent heating walls each having two superposed groups of vertical flame flues, means for connecting each of the said groups of one wall in series with the correspondingly disposed group of the other wall, regenerators communicably connected to each end of the respective series of groups of flame flues, means for supplying lean gas for combustion in each of said series and means for supplying rich gas for combustion in each of said series.

15. A battery of vertical coke ovens comprising a series of alternate oven chambers and heating walls therefor arranged in a row, two rows of regenerators parallel with said row of oven chambers and heating walls on each of opposite sides of said battery and in horizontal alinement with approximately the lower half only of said chambers and said walls and passageways for operatively connecting said regenerators at their top portions to co-operating heating walls.

16. A battery of vertical coke ovens comprising a series of alternate oven chambers and heating walls therefor, each of said walls being provided with a plurality of groups of flame flues in superposed relation, a series of regenerators extending alongside the battery in horizontal alinement with approximately the lower half only of said ovens and said walls and means for communicably connecting each of said regenerators at its top portion to one group of said flame flues at substantially the middle portions of the several heating walls.

17. A battery of vertical coke ovens comprising a series of alternate oven chambers and heating walls therefor, each of said walls being provided with a plurality of superposed groups of vertical flame flues, a series of regenerators extending along each of opposite sides of the battery and in horizontal alinement with approximately the lower half only of said ovens and said walls, means for communicably connecting each of said regenerators at its top portion to one group of flame flues at its top or bottom portion, as the case may be, in substantially the middle portions of the several heating walls, all of the regenerators on one side of the battery being adapted to transmit air or gas simultaneously while the regenerators on the other side transmit waste gases simultaneously.

18. In a coking retort oven battery, two separate heating systems each of which comprises two groups of vertical flame flues connected in series, a flue for connecting end portions of the flame flues of each group, a communicating passageway with a connecting flue of each group and a similar flue of the other group in the system, and regenerators communicably connected to each of the other flues of the several groups, each group of one system being in superposed relation with respect to a group of the other system.

19. In a coking retort oven battery, two heating systems each of which comprises two groups of vertical flame flues connected in series, a horizontal flue for connecting end portions of the flame flues of each group, a passageway connecting a horizontal flue of each group and a horizontal flue of the other group in the system, and regenerators communicably connected to each of the other horizontal flues of the several groups, each group of one system being in superposed relation with respect to a group of the other system.

20. In a vertical coke oven battery, a heating wall having two groups of flame flues in superposed relation, and means for supplying one of said groups with combustible materials for burning therein, and means for simultaneously and separately supplying the other of said groups with hot products of combustion, the supplying means being adapted to periodically reverse the directions of gas flow within the respective groups of flues.

21. In a vertical coke oven battery, a heating wall having two independent groups of flame flues in superposed relation, and means for supplying one of said groups with combustible materials for burning therein and simultaneously supplying the other of said groups with hot products of combustion, the supplying means being adapted to periodically reverse the direction of gas flow within the respective groups of flues.

22. In a vertical coke oven battery, a heating wall having two superposed groups of vertical flame flues, means for supplying one of said groups with combustible materials for burning therein, means operable simultaneously with the aforesaid means for supplying the other group with hot waste gases and means for periodically and simultaneously supplying the latter group with combustible materials for burning in the opposite direction and the former group with hot waste gases also in the opposite direction.

23. A battery of vertical coke ovens comprising heating walls each provided with two superposed groups of flame flues, means comprising regenerators permanently in series with the upper group of flame flues for transmitting combustible materials thereto or transmitting waste gases therefrom according to the direction of flow through said flame flues and means comprising other regenerators permanently in series with the lower group of flame flues for similarly but independently transmitting combustible materials to or waste gases from said lower group.

24. A battery of vertical coke ovens comprising heating walls each provided with two superposed groups of vertical flame flues, a row of regenerators on each of two opposite sides of said battery, certain of said regenerators in each row being permanently connected in series with upper groups only of flame flues and the other regenerators being independently and permanently connected in series with lower groups only of said flame flues whereby, in either direction of flow through any group of flame flues, combustible materials may be transmitted to that group by a regenerator which has previously transmitted waste gases therefrom.

25. In a vertical coking retort battery, a heating wall comprising two superposed groups of vertical flame flues and horizontal brickwork therebetween, horizontal flues in said brickwork and respectively communicating with the flame flues of the upper and the lower groups and means for supplying combustible materials for burning in the one or the other of said horizontal flues and the flame flues of the group connected thereto.

26. In a vertical coking retort battery, a heating wall comprising two superposed groups of vertical flame flues and horizontal brickwork therebetween, horizontal flues in said brickwork and respectively communicating with the flame flues of the upper and the lower groups and means comprising regenerators communicating with each of said horizontal flues for supplying combustible materials for burning therein and in the group of flame flues connected thereto or for conducting waste gases therefrom, according to the direction of flow therethrough.

27. A battery of vertical coke ovens comprising a series of alternate oven chambers and heating walls therefor arranged in a row, said heating walls having flame flues, two rows of regenerators extending along each of opposite sides of said battery and communicating with the flame flues of said heating walls and in horizontal alinement with a portion of the height of said oven chambers and said walls and communicably connected to the flame flues of said heating walls, all of the regenerators on one side of the battery being adapted to transmit air or gas simultaneously while the regenerators on the other side transmit waste gases simultaneously.

28. A battery of vertical coke ovens comprising a series of alternate oven chambers and heating walls therefor arranged in a row, said heating walls having flame flues therein, two rows of regenerators extending along each of opposite sides of said battery communicating with the flame flues of said heating walls and in horizontal alinement with a portion of the height of said oven chambers and said walls, all of the regenerators on one side of the battery being adapted to transmit ingoing gases simultaneously while the regenerators on the other side transmit outgoing gases simultaneously.

In testimony whereof, I have hereunto subscribed my name this 24th day of January, 1928.

JOSEPH VAN ACKEREN.